United States Patent
Ryder et al.

(10) Patent No.: US 8,684,102 B2
(45) Date of Patent: Apr. 1, 2014

(54) SEEDING IMPLEMENT DEPTH ADJUSTMENT MECHANISM

(71) Applicant: CNH Canada, Ltd., Saskatoon (CA)

(72) Inventors: Nicholas George Alfred Ryder, Saskatoon (CA); Kevin Hall, Saskatoon (CA)

(73) Assignee: CNH Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 13/724,731

(22) Filed: Dec. 21, 2012

(65) Prior Publication Data

US 2013/0140047 A1 Jun. 6, 2013

Related U.S. Application Data

(63) Continuation of application No. 12/693,910, filed on Jan. 26, 2010, now Pat. No. 8,342,258.

(51) Int. Cl.
*A01B 5/00* (2006.01)
*A01B 49/02* (2006.01)
*A01B 49/04* (2006.01)
*A01C 5/00* (2006.01)
*A01C 13/00* (2006.01)

(52) U.S. Cl.
USPC ........... 172/395; 172/196; 111/136; 111/156; 111/194

(58) Field of Classification Search
USPC ......... 172/610, 547, 558–566, 395, 195, 196; 111/167, 168, 149, 156, 157, 163, 164, 111/190, 192–194, 52, 59, 62, 134–136
See application file for complete search history.

(56) References Cited

U.S. PATENT DOCUMENTS 6,386,127 B1 5/2002 Prairie et al.

OTHER PUBLICATIONS www.bikesomewhere.com/bikesomewhere.cfm/product/7/4138/15270.

*Primary Examiner* — Christopher J Novosad
(74) *Attorney, Agent, or Firm* — Rebecca L. Henkel

(57) ABSTRACT

A seeding implement is provided that includes a depth adjustment mechanism configured to facilitate rapid reconfiguration of a ground engaging tool for varying penetration depths. In an exemplary embodiment, the seeding implement includes a ground engaging tool and a packer arm pivotally coupled to a packer support structure. The seeding implement also includes a packer wheel rotatably coupled to the packer arm, and configured to rotate across a soil surface to limit a penetration depth of the ground engaging tool into the soil. The seeding implement further includes a depth adjustment assembly including a slot within the packer support structure, a corresponding slot within the packer arm, and a fastener disposed through the slots. In this configuration, the penetration depth of the ground engaging tool is varied by adjusting a position of the fastener within the slots.

12 Claims, 6 Drawing Sheets

SEEDING IMPLEMENT DEPTH ADJUSTMENT MECHANISM

CROSS REFERENCE TO RELATED APPLICATIONS

This application is a continuation of U.S. patent application Ser. No. 12/693,910, entitled "SEEDING IMPLEMENT DEPTH ADJUSTMENT MECHANISM", filed Jan. 26, 2010, which is herein incorporated by reference.

BACKGROUND

The invention relates generally to a seeding implement depth adjustment mechanism, and more specifically, to a depth adjustment assembly configured to vary a penetration depth of a ground engaging tool by adjusting a position of a fastener within a slot in a packer support structure and a corresponding slot in a packer arm.

Generally, seeding implements are towed behind a tractor or other work vehicle via a mounting bracket secured to a rigid frame of a planter or seeder. These seeding implements typically include a ground engaging tool or opener that forms a seeding path for seed deposition into the soil. The opener is used to break the soil to enable seed deposition. After the seed is deposited, the opener is followed by a packer wheel that packs the soil on top of the deposited seed. The packer wheel also serves to adjust a penetration depth of the opener within the soil. In certain configurations, the penetration depth of the opener is adjustable by varying a vertical position of the packer wheel relative to the opener.

In typical configurations, the packer wheel is pivotally coupled to a packer support structure by a packer arm. Rotation of the packer arm relative to the packer support structure varies the vertical position of the packer wheel. In certain configurations, the packer arm includes a series of openings configured to receive a fastener. The openings are positioned such that the angle of the packer arm relative to the packer support structure may be varied by securing the fastener to a particular opening. However, removing the fastener from one opening, rotating the packer arm relative to the packer support structure, and securing the fastener within another opening is a time consuming process. Furthermore, certain implements may include a large number of openers (e.g., greater than 50, 60, 70, 80, 90, or more). Because the openers are typically configured to maintain the same penetration depth, the duration of the depth adjustment process is multiplied by the number of openers coupled to the implement. Consequently, reconfiguration of the implement for a different penetration depth may result in large delays in seeding operations, thereby decreasing seeding efficiency.

BRIEF DESCRIPTION

The present invention provides a seeding implement depth adjustment mechanism configured to facilitate rapid reconfiguration of the ground engaging tool for varying penetration depths. In an exemplary embodiment, the seeding implement includes a ground engaging tool and a packer arm pivotally coupled to a packer support structure. The seeding implement also includes a packer wheel rotatably coupled to the packer arm, and configured to rotate across a soil surface to limit a penetration depth of the ground engaging tool into the soil. The seeding implement further includes a depth adjustment assembly including a slot in the packer support structure, a corresponding slot in the packer arm, and a fastener disposed through the slots. In this configuration, the penetration depth of the ground engaging tool is varied by adjusting a position of the fastener within the slots. Because the fastener remains disposed within the slots during the adjustment process, the penetration depth of the ground engaging tool may be varied more rapidly than configurations that require removal of the fastener to reposition the packer arm.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
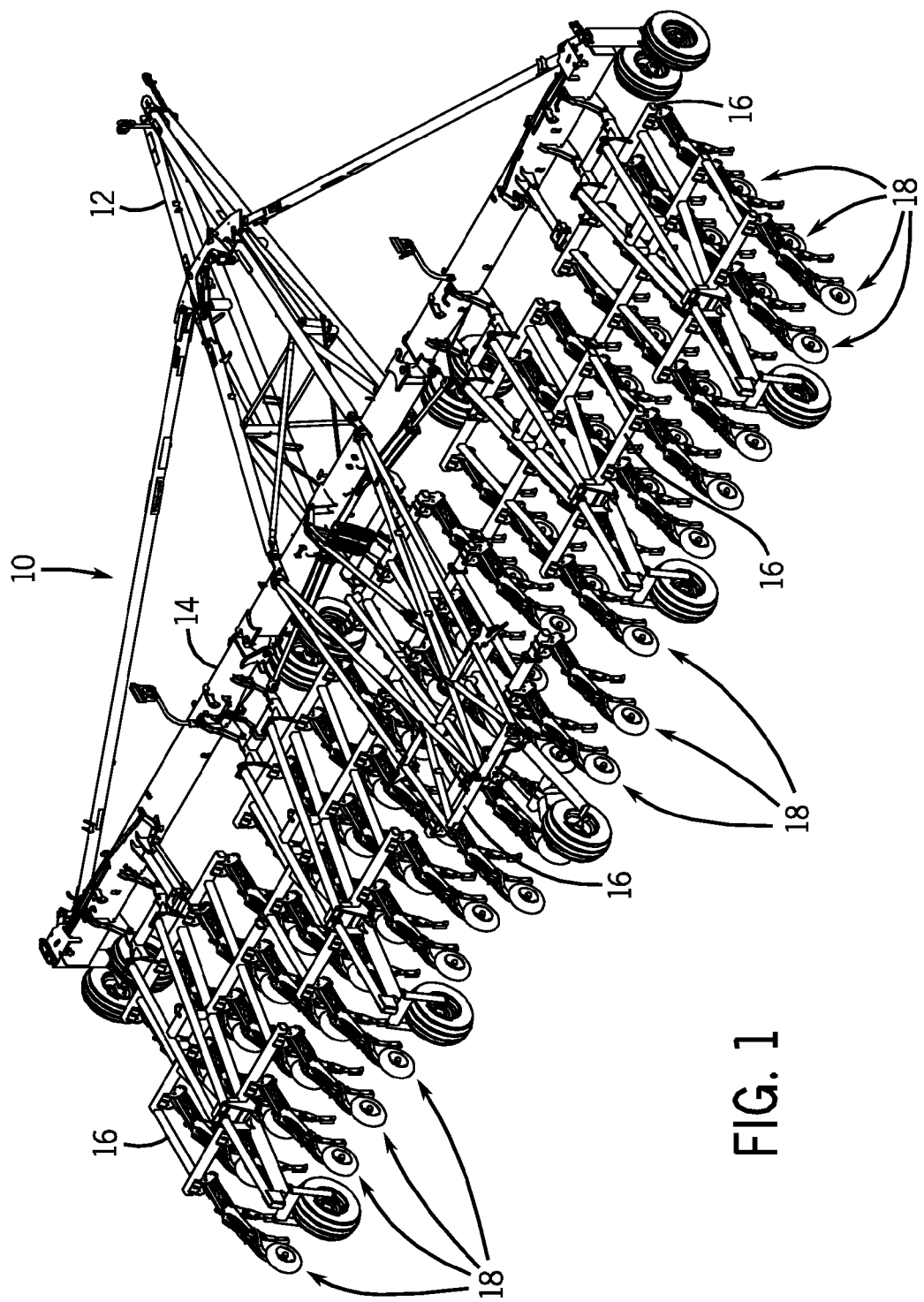
FIG. 1 is a perspective view of a planter implement including multiple seeding implements each having a depth adjustment assembly.

Turning now to the drawings, FIG. 1 is a perspective view of a seeding implement 10. The implement 10 is designed to be towed behind a work vehicle such as a tractor. The implement 10 includes a tow bar assembly 12 which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple tool frames 16. Each tool frame 16 includes multiple seeding implements, such as the illustrated hoe openers 18. As discussed in detail below, each hoe opener 18 includes a depth adjustment assembly configured to facilitate rapid reconfiguration of the hoe opener 18 for varying penetration depths.

Figure 2:
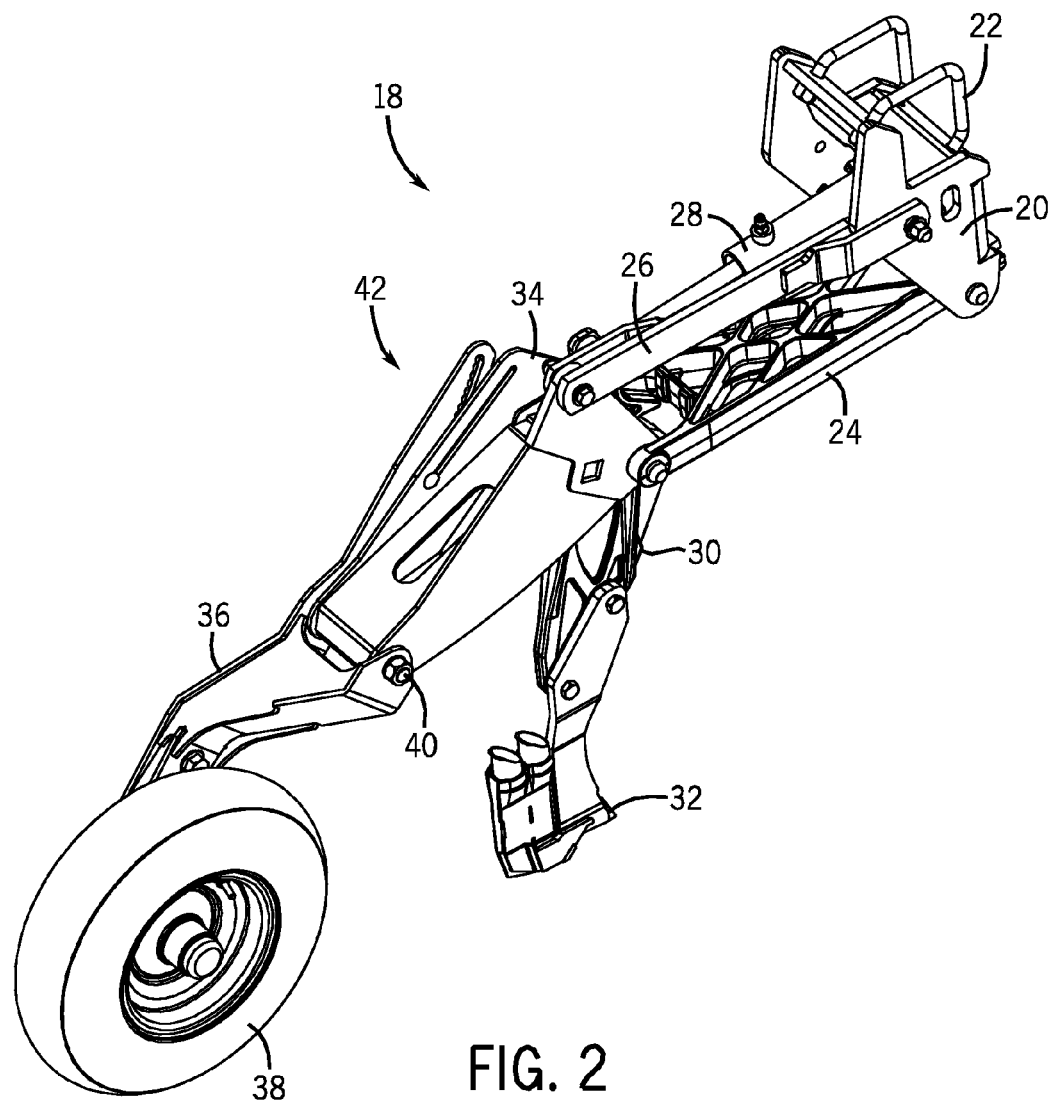
FIG. 2 is a perspective view of an exemplary seeding implement having a depth adjustment assembly configured to facilitate rapid reconfiguration.

FIG. 2 is a perspective view of an exemplary hoe opener 18 having a depth adjustment assembly configured to facilitate rapid reconfiguration of opener penetration depth. As will be appreciated, the hoe opener 18 is a type of row unit, which may be placed on an agricultural implement, such as the seeding implement 10 shown in FIG. 1. As illustrated, the hoe opener 18 includes a frame support 20, mounting brackets 22, a first member 24, a second member 26, and a biasing device such as a cylinder 28 (e.g., hydraulic and/or pneumatic piston-cylinder assembly). The cylinder 28 may be hydraulically coupled to a power supply that provides a flow of pressurized hydraulic fluid which displaces a piston rod extending from the cylinder. The frame support 20 and frame bracket 22 are configured to interface with the tool frame 16, thereby securing the hoe opener 18 to the seeding implement 10. For instance, multiple hoe openers 18 may be mounted in parallel along the tool frame 16 to form a seeding unit. In the present configuration, the first member 24, the second member 26, and the frame support 20 form elements of a parallel linkage, also known as a four bar linkage. As will be appreciated, components of the hoe opener 18, such as the frame support 20, mounting brackets 22, first member 24, and second member 26, may be made of any suitable material, such as steel.

The cylinder 28 is attached to a shank 30 via a pin at the end of the piston rod. A ground engaging tool, such as the illustrated opener 32, is also disposed to the shank 30 and configured to engage the soil. Contact force between the opener 32 and the soil establishes a moment about a shank pivot joint. This moment is resisted by force applied to the shank 30 by the cylinder 28. Furthermore, the linkage is configured to facilitate vertical movement of the implement 10, while maintaining the opener 32 at a desired penetration depth within the soil. As illustrated, the linkage is coupled to a packer support structure, such as the illustrated packer support plate 34.

A packer arm 36, including a packer wheel 38, is pivotally coupled to the packer support structure 34. The packer wheel 38 rotates along the soil surface to both pack the soil on top of deposited seeds and limit the penetration depth of the opener 32. As illustrated, a pin 40 disposed through openings within the packer arm 36 and the packer support structure 34 enables rotation of the packer arm 36 with respect to the packer support structure 34. However, in a working mode, rotation of the packer arm 36 relative to the packer support structure 34 is blocked by a depth adjustment assembly 42. As discussed in detail below, the depth adjustment assembly 42 includes a fastener disposed within a slot in the packer support structure 34 and a corresponding slot in the packer arm 36. While in a locked position, the fastener blocks rotation of the packer arm 36 with respect to the packer support structure 34. Conversely, while in an unlocked position, the fastener may be translated within the respective slots to adjust the rotation of the packer arm 36 about the pin 40. Such an adjustment varies the vertical position of the opener 32 relative to the packer wheel 38, thereby altering the penetration depth of the opener 32. Once a desired penetration depth has been established, the fastener may be locked into position, thereby limiting rotation of the packer arm 36 and enabling the hoe opener 18 to enter the working mode. As previously discussed, the packer wheel 38 rotates across a surface of the soil to limit the penetration depth of the opener 32. Consequently, the difference in vertical position between the packer wheel 38 and the opener 32 defines the penetration depth of the opener 32 within the soil. Because the fastener remains disposed within the slots during the adjustment process, the penetration depth of the opener may be varied more rapidly than configurations that require removal of the fastener to reposition the packer arm.

Figure 3:
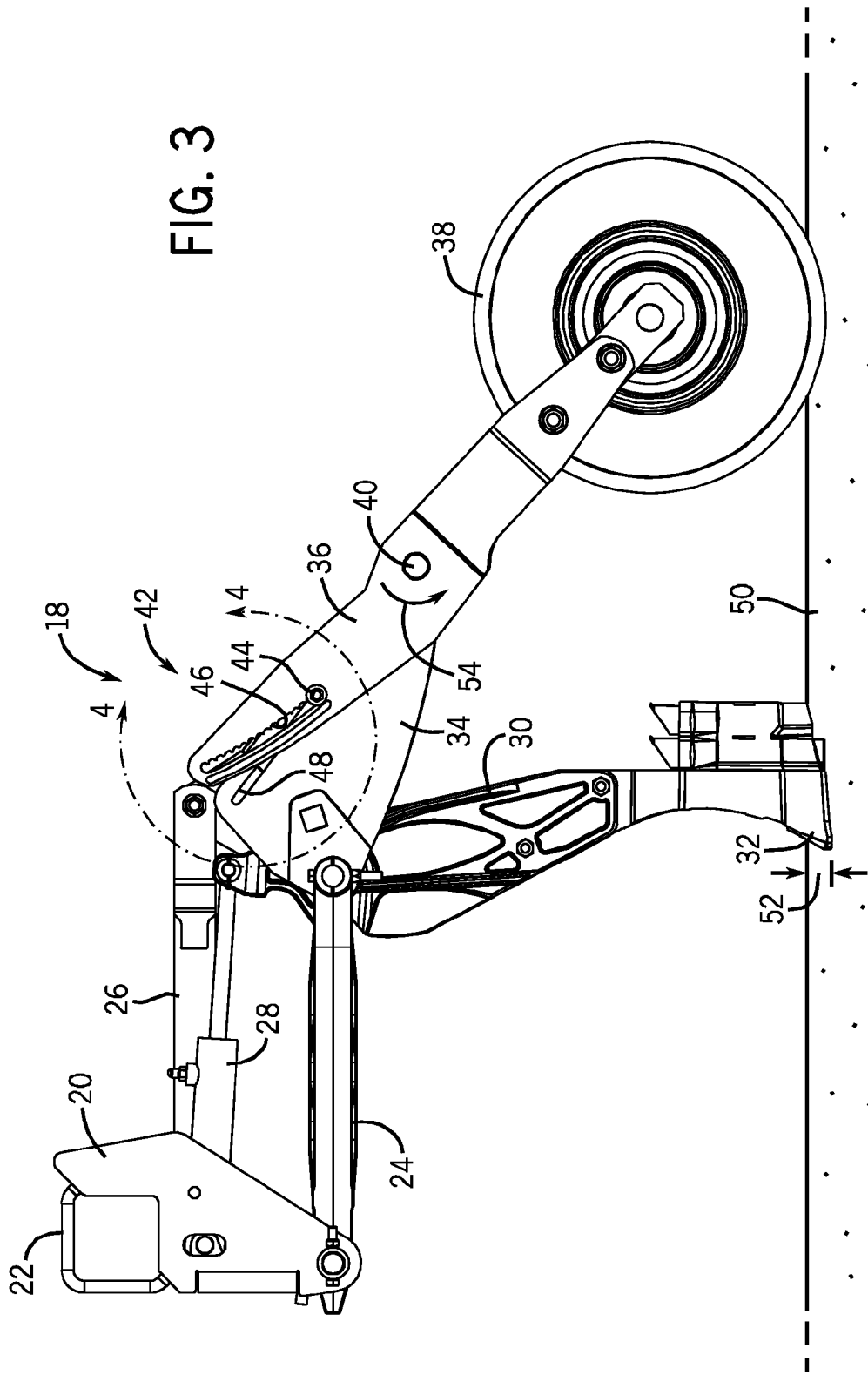
FIG. 3 is a side view of the seeding implement, as shown in FIG. 2, illustrating operation of the opener and packer wheel.

FIG. 3 is a side view of the hoe opener 18, as shown in FIG. 2, illustrating operation of the opener 32 and packer wheel 38. Specifically, the opener 32 is configured to engage soil 50 at a particular depth 52. The depth 52 may be selected based on soil conditions, seeds, or environmental factors, among other considerations. As illustrated, the depth adjustment assembly 42 includes a fastener 44, a slot 46 within the packer arm 36, and a slot 48 within the packer support structure 34. As discussed in detail below, the fastener 44 is movable within the slots 46 and 48 to adjust the penetration depth 52. Specifically, movement of the fastener 44 from the illustrated position will cause the packer arm 36 to rotate about the pin 40 in the direction 54. As the packer arm 36 rotates, the vertical position of the opener 32 varies with respect to the packer wheel 38. Because the packer wheel 38 is configured to rotate across the top of the soil 50, varying the vertical position of the opener 32 with respect to the wheel 38 varies the penetration depth 52 of the opener 32 within the soil 50.

Figure 4:
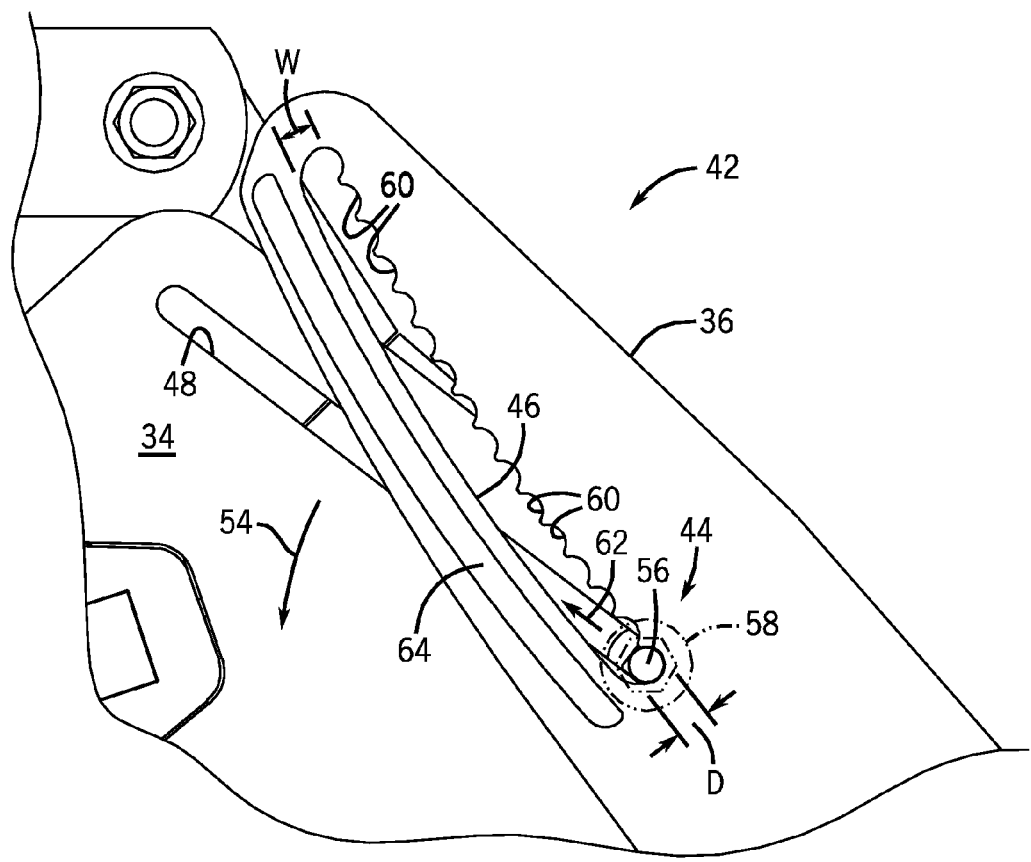
FIG. 4 is a detailed side view of the depth adjustment assembly taken within line 4-4 of FIG. 3.

FIG. 4 is a detailed side view of the depth adjustment assembly 42 taken within line 4-4 of FIG. 3. As previously discussed, movement of the fastener 44 from the illustrated position within the slots 46 and 48 will cause the packer arm 36 to rotate in the direction 54. In the present configuration, the fastener 44 includes a bolt 56 and a nut 58. Alternative embodiments may employ other fastener configurations, such as cam-locks, pins, or other types of fasteners. As illustrated, the fastener 44 is in a locked position that blocks movement of the packer arm 36 with respect to the packer support structure 34. Specifically, the packer arm slot 46 includes a series of indentations 60 configured to receive the bolt 56 and block movement of the bolt 56 in a direction 62. In the locked position, the nut 58 is secured to the bolt 56 with sufficient torque to prevent the bolt 56 from moving out of the indentation 60. As will be appreciated, when sufficient torque is applied to the nut 58, contact or clamping force between the nut 58, the packer arm 36, the packer support structure 34 and a head of the bolt 56 will limit movement of the bolt 56 out of the indentation 60. With the bolt 56 secured within the indentation 60, movement of the fastener 44 in the direction 62 is blocked, thereby blocking rotation of the packer arm 36 with respect to the packer support structure 34 in the direction 54.

The present embodiment also includes a guide plate 64 positioned substantially parallel to the slot 46 in the packer arm 36. As illustrated, the guide plate 64 extends above the surface of the packer arm 36 adjacent to the nut 58. The guide plate 64 is positioned such that contact between the nut 58 and the guide plate 64 blocks movement of the bolt 56 out of the indentation 60. Such a configuration may prevent the fastener 44 from moving within the slots 46 and 48 even if the torque applied to the nut 58 is insufficient to retain the bolt 56 within the indentation 60. Furthermore, the guide plate 64 may provide a visual indication that the bolt 56 is fully seated within the slots 46 and 48 after the nut 58 has been tightened.

To facilitate rotation of the packer arm 36 with respect to the packer support structure 34, the fastener 44 may be transitioned from the locked position to the unlocked position. In the present embodiment, transitioning the fastener 44 to the unlocked position involves loosening the nut 58, thereby decreasing the clamping force of the bolt 56 and nut 58 on the packer arm 36 and the packer support structure 34. In embodiments without the guide plate 64, loosening the nut 58 enables the bolt 56 to move out of the indentation 60, thereby facilitating movement of the fastener in the direction 62 within the slots 46 and 48. As illustrated, a diameter D of the bolt 56 is less than a minimum width W of the slot 46. Consequently, the bolt 56 may move within the slot 46 to any desired location. As previously discussed, movement of the fastener 44 within the slots 46 and 48 induces the packer arm 36 to rotate with respect to the packer support structure 34.

In the illustrated embodiment, the guide plate 64 blocks movement of the bolt 56 out of the indentation 60 even after the nut 58 has been loosened. Consequently, to remove the bolt 56 from the indentation 60, the nut 58 may be rotated about the bolt 56 until the nut 58 is positioned above the height of the guide plate 64. At that point, the bolt 56 may be moved out of the indentation 60 such that the fastener 44 may translate in the direction 62 within the slots 46 and 48. As will be appreciated, while the bolt 56 is positioned outside of the indentation 60, the nut 58 will overlap the guide plate 64. As a result, an operator may easily identify a fastener 44 in an unlocked position.

As the fastener 44 moves in the direction 62, the packer arm 36 rotates in the direction 54 relative to the packer support structure 34. As previously discussed, such rotation varies the position of the packer wheel 38 with respect to the opener 32, thereby varying the penetration depth of the opener 32 within the soil 50. Once a desired penetration depth has been selected via movement of the fastener 44 within the slots 46 and 48, the bolt 56 may be moved into an indentation 60 at the approximate location of the desired fastener position. The fastener 44 may then be transitioned from the unlocked position to the locked position. For example, in the present embodiment, the nut 58 may be tightened until the clamping force applied by the nut 58 and bolt 56 is sufficient to secure the bolt 56 within the desired indentation 60. As previously discussed, in embodiments including the guide plate 64, once the nut 58 has reached a position below the height of the guide plate 64, contact between the guide plate 64 and the nut 58 blocks movement of the bolt 56 out of the desired indentation 60.

Because the bolt 56 is disposed within an indentation 60 when the fastener 44 is in the locked position, the position of the packer wheel 38 may be quickly determined by identifying the particular indentation 60 that captures the bolt 56. Consequently, once a desired penetration depth for one opener 32 has been established, the penetration depths of the other openers 32 may be adjusted by moving each fastener 44 to a corresponding indentation 60 (i.e., an indentation corresponding to the position of the indentation of the first opener 32), thereby establishing a substantially constant penetration depth across the implement 10. Furthermore, because the fastener 44 may be transitioned from the locked position to the unlocked position, and from the unlocked position to the locked position, without removing the nut 58 from the bolt 56, adjusting the penetration depth of each hoe opener may be performed more rapidly than conventional configurations including a pin and multiple discrete holes. Due to the large number of hoe openers 18 on a typical implement 10, decreasing transition time between penetration depths may significantly reduce implement adjustment time, thereby increasing operational efficiency.

Figure 5:
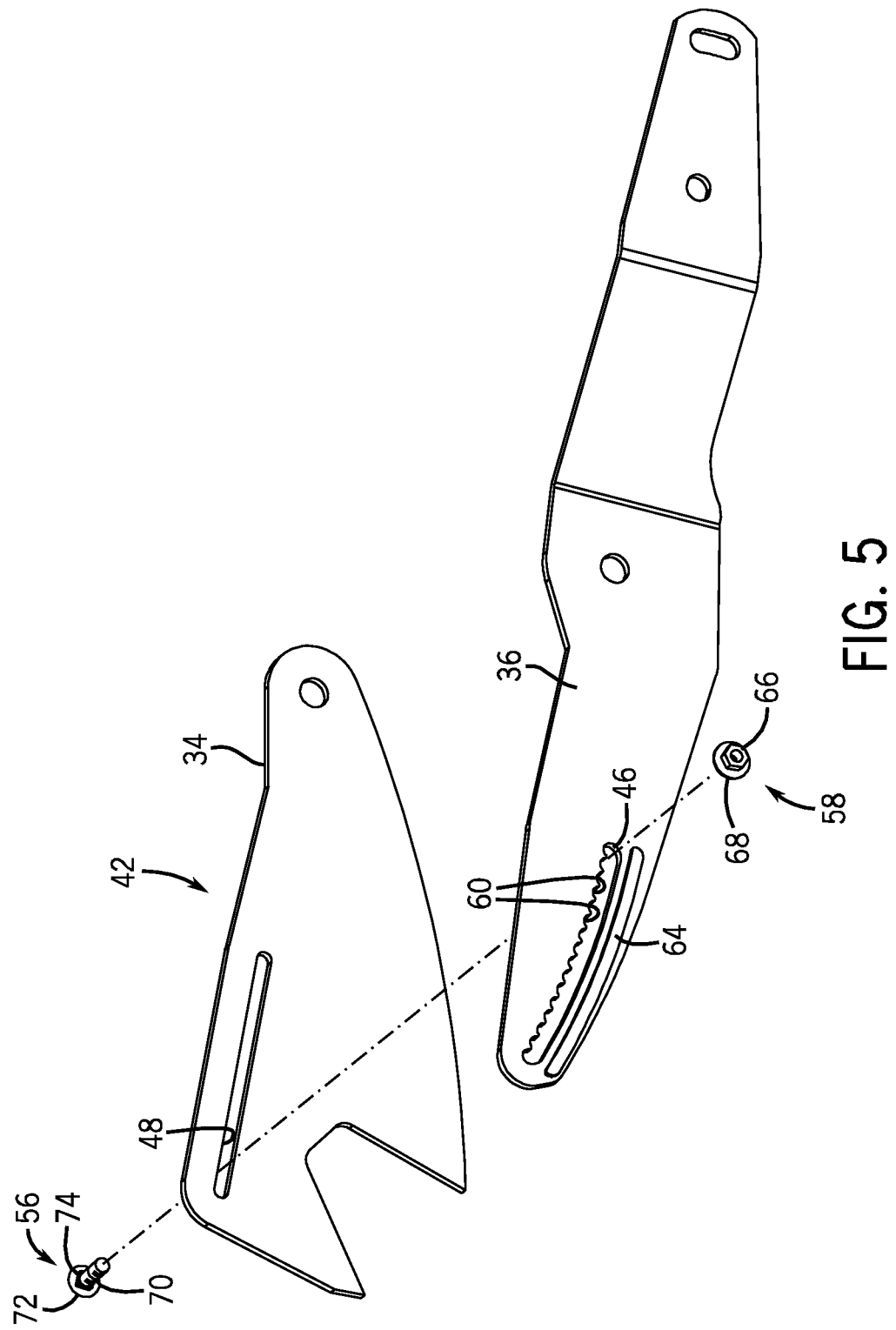
FIG. 5 is an exploded view of the depth adjustment assembly as shown in FIG. 2.

FIG. 5 is an exploded view of the depth adjustment assembly 42 as shown in FIG. 2. As illustrated, the nut 58 includes a head 66 and body 68. As will be appreciated, the head 66 is configured to interface with a tool, such as a wrench, to facilitate rotation of the nut 58 with respect to the bolt 56. While the present embodiment employs a hexagonal head 66, alternative embodiments may employ other suitable head configurations, such as slotted, square, etc. As previously discussed, the body 68 of the nut 58 is configured to contact the guide plate 64 while in the locked position to block movement of the bolt 56 out of the indentation 60. Furthermore, the body 68 is sized to overlap a sufficient area of the packer arm 36 to establish a clamping force that holds the bolt 56 within the indentation 60.

In the present configuration, the bolt 56 is a carriage bolt that includes a threaded shaft 70, a head 72 and a square portion 74. As illustrated, the threaded shaft 70 is configured to pass through the slot 48 of the packer support structure 34 and the slot 46 of the packer arm 36. The external threads of the shaft 70 are configured to interface with internal threads of the nut 58. The length of each side of the square portion 74 is substantially similar to the width of the slot 48 within the packer support structure 34. Consequently, when the square portion 74 of the bolt 56 is disposed within the slot 48, rotation of the bolt 56 is blocked by contact between the sides of the square portion 74 and the edges of the slot 48. In this configuration, the nut 58 may be tightened and loosened without a second tool to hold the bolt 56 in place. Consequently, the time associated with locking and unlocking the fastener may be reduced compared to configurations that employ a first tool for the nut 58 and a second tool for the bolt 56. As previously discussed, other fasteners may be employed to block rotation of the packer arm 36 with respect to the packer support structure 34. For example, certain embodiments may employ a cam-lock that is engaged and disengaged by hand, thereby obviating the use of any tools. Such a configuration may further decrease the time to reconfigure each hoe opener 18 for a different penetration depth.

Figure 6:
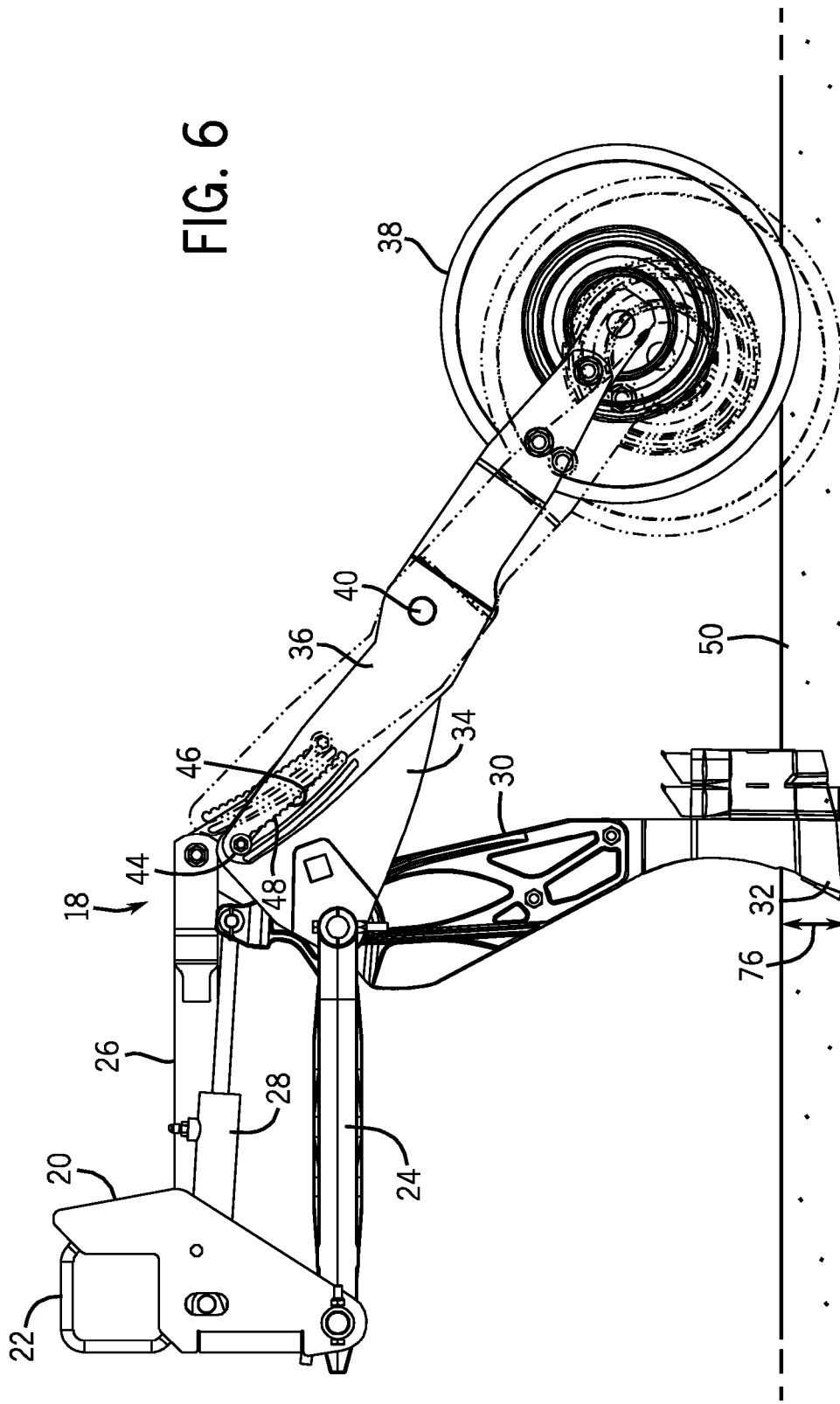
FIG. 6 is a side view of the seeding implement, as shown in FIG. 2, illustrating rotation of the packer arm.

FIG. 6 is a side view of the hoe opener 18, as shown in FIG. 2, illustrating rotation of the packer arm 36. The dashed lines represent the position of the packer arm 36 as shown in FIG. 3. Specifically, with the packer arm 36 in the dashed line position, the fastener 44 is positioned at the lower extent of the slots 46 and 48. Consequently, the opener 32 is positioned to establish a minimum penetration depth 52. Conversely, the solid packer arm 36 is positioned at a maximum penetration depth 76 of the opener 32 within the soil 50. As illustrated, the fastener 44 is positioned at the upper extent of the slots 46 and 48, thereby rotating the packer arm 36 to the illustrated position. In the present configuration, the slots 46 and 48 are configured to provide at least approximately two inches of penetration depth adjustment between the illustrated position and the position shown in FIG. 3. Specifically, the slots 46 and 48 are angled relative to the packer arm rotation axis about the pin 40. As will be appreciated, the angle between the slots 46 and 48 and the rotation axis affects the ratio between fastener movement and penetration depth adjustment. For example, in certain configurations, the slots 46 and 48 are approximately five inches long, thereby providing the fastener with approximately five inches of travel. Consequently, a five inch movement of the fastener causes a two inch variation in opener penetration depth. Therefore, the penetration depth may be precisely established by positioning the fastener 44 within the slots 46 and 48. Furthermore, the slot 46 within the packer arm 36 is curved to extend the length of the slot 46, thereby facilitating finer adjustment of the penetration depth. As will be appreciated, alternative embodiments may include more or less penetration depth adjustability, larger or smaller angles of the slots 46 and 48 relative to the packer arm rotation axis, and/or longer or shorter slots 46 and 48.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seeding implement, comprising:
   a frame configured to be coupled to a tool bar;
   a linkage coupled to the frame and including a packer support structure;
   a ground engaging tool extending from a shank, wherein the shank is coupled to the linkage;
   a packer arm pivotally coupled to the packer support structure;
   a packer wheel rotatably coupled to the packer arm, and configured to control a vertical position of the ground engaging tool relative to a soil surface; and
   a depth adjustment assembly including, a slot in the packer support structure, a corresponding slot in the packer arm, and a fastener disposed through the slots, wherein the fastener is configured to secure the packer arm to the packer support structure while in a locked position and to enable rotation of the packer arm with respect to the packer support structure while in an unlocked position, and wherein the fastener remains disposed through the slots while in both the locked and unlocked positions.

2. The seeding implement of claim 1, wherein each slot is at least approximately five inches long.

3. The seeding implement of claim 1, wherein the vertical position of the ground engaging tool relative to the soil surface is adjustable by at least two inches.

4. The seeding implement of claim 1, wherein the slot within the packer arm is curved.

5. The seeding implement of claim 1, wherein the slots are angled relative to an axis of rotation of the packer arm.

6. The seeding implement of claim 1, wherein the slot within the packer arm includes a plurality of indentations configured to receive the fastener.

7. The seeding implement of claim 6, wherein the packer arm includes a guide plate positioned adjacent to the slot within the packer arm, and wherein the guide plate is configured to block movement of the fastener out of an indentation of the plurality of indentations while the fastener is in the locked position.

8. The seeding implement of claim 6, wherein movement of the fastener between the plurality of indentations varies a penetration depth of the ground engaging tool.

9. The seeding implement of claim 1, wherein the fastener comprises a bolt having a head and a threaded shaft, and a nut configured to secure to the threaded shaft.

10. The seeding implement of claim 1, wherein the ground engaging tool comprises an opener.

11. The seeding implement of claim 1, wherein the packer wheel is configured to rotate across the soil surface to limit a penetration depth of the ground engaging tool into the soil.

12. The seeding implement of claim 1, wherein a penetration depth of the ground engaging tool is varied by adjusting a position of the fastener within the slots.

* * * * *